United States Patent [19]

Stuckmann

[11] 4,059,965
[45] Nov. 29, 1977

[54] APPARATUS FOR AND A METHOD OF LAYING A PIPE LINE

[75] Inventor: Dieter Stuckmann, Selm, Germany

[73] Assignee: Gewerkschaft Eisenhutte Westfalia, Wethmar near Lunen, Germany

[21] Appl. No.: 687,077

[22] Filed: May 17, 1976

[30] Foreign Application Priority Data

May 27, 1975 Germany .............................. 2523339

[51] Int. Cl.² .......................... F16L 1/00; E21D 11/00
[52] U.S. Cl. ..................................... 61/105; 61/41 A; 61/85
[58] Field of Search .................. 61/41 A, 42, 85, 72.7, 61/105

[56] References Cited

U.S. PATENT DOCUMENTS

| 3,916,629 | 11/1975 | Thompson | 61/41 A |
| 3,967,454 | 7/1976 | Barnes | 61/41 A |

FOREIGN PATENT DOCUMENTS

| 1,308,763 | 3/1973 | United Kingdom | 61/41 A |

Primary Examiner—Jacob Shapiro
Attorney, Agent, or Firm—Sughrue, Rothwell, Mion, Zinn and Macpeak

[57] ABSTRACT

Apparatus for and a method of laying a pipe line utilizes a drive shield for excavating an open trench and a receptacle for receiving the individual pipe sections. The receptacle has a rear wall with an opening provided with a seal engaging on part of the circumference of a pipe section extending into the interior of the receptacle. A plate is attached to the rear wall and has a seal which engages on the remaining part of the circumference of the pipe section so that the interior of the receptacle is sealed with respect to the exterior and the receptacle can be moved up to follow the progress of the drive shield. A pipe section employing an access tube projecting from its circumference can be accommodated by using a hollow unit having a seal also engageable on the circumference of the pipe section previously installed and communicating with the interior of the receptacle when the plate is removed or displaced. The unit then receives the access tube of the pipe section as the receptacle is moved up. Subsequently the plate can be relocated to re-establish the seal inwardly of the unit which can then be removed.

8 Claims, 5 Drawing Figures

APPARATUS FOR AND A METHOD OF LAYING A PIPE LINE

BACKGROUND TO THE INVENTION

The present invention relates to an apparatus for, and a method of, laying a pipe line composed of individual pipe sections arranged end-to-end.

In the construction of a pipe line it is well known to excavate an open-trench and to lower the individual prefabricated pipe sections into the trench which is subsequently refilled. Planks or frameworks can be used to support the walls of the trench while the pipe sections are introduced and connected together. This known method is problematic especially where the ground is water-logged and/or where relatively large diameter pipe sections are used.

One form of apparatus which is useful in coping with these problems uses a box-like receptacle into which the pipe sections are introduced.

With certain types of pipe line it is known to provide line access tubes or shafts which communicate with the line at intervals. For this purpose some of the pipe sections, which are usually prefabricated concrete structures, have integral therewith an upstanding access tube which can provide connection to the pipe line at a certain position along its length — typically 50-70 meters apart. Where these special pipe sections are used the upstanding tubes thereof cause difficulties especially with regard to the sealing of the receptacle in water-logged ground.

A general object of this invention is to provide an improved method and apparatus designed to accommodate these special pipe sections.

SUMMARY OF THE INVENTION

In one aspect the invention provides an apparatus for use in laying a pipe line which is composed of individual pipe sections arranged end-to-end; said apparatus comprising means for forming an open trench and for supporting the walls thereof, a receptable disposed rearwardly of the trench-forming means for receiving individual pipe sections, a sealed or sealable opening between the interior and exterior of the receptacle permitting the pipe sections to be arranged end-to-end and the receptacle to be moved in the direction of advancement as the pipe line is extended and means defining part of the opening and capable of selectively extending the interior of the receptacle while maintaining its sealing to thereby accommodate a pipe section provided with an access tube projecting outwardly from its exterior periphery. The invention also provides an apparatus for use in laying a pipe line which is composed of individual pipe sections arranged end-to-end; said apparatus comprising means for forming an open trench and for supporting the walls thereof, a receptacle disposed rearwardly of the trench forming means for receiving the individual pipe sections, a sealed or sealable opening between the interior and exterior of the receptacle permitting the pipe sections to be arranged end-to-end and the receptacle to be moved in the direction of advancement as the pipe line is extended, a component or plate and a hollow unit each capable of defining part of the opening with the hollow unit being adapted to extend the interior of the receptacle while maintaining the sealing whereby the plate and the unit are usable individually and successively to accommodate a pipe section provided with an access tube projecting outwardly from its exterior periphery.

In another aspect the invention provides a method of laying a pipe line composed of pipe sections arranged end-to-end; said method comprising excavating an open trench, introducing a pipe section into a receptable located in the trench, arranging the pipe section in end-to-end relationship with a pipe section previously-installed and projecting through a sealed opening into the interior of the receptacle, displacing the receptacle to follow-up the advancement of the trench and repeating said sequence and whenever the pipe section to be introduced is provided with an access tube projecting outwardly from its exterior periphery carrying out the following additional steps: utilizing a hollow unit to extend the interior of the receptacle and engage on the exterior of the previously-installed pipe section to form part of the sealed opening, removing or displacing a plate defining part of the sealed opening to permit the tube of the newly-introduced pipe section to pass into the interior of the unit as the receptacle is displaced, relocating the plate to re-establish a seal with the pipe section inwardly of the receptacle relative to its tube and removing or displacing the unit to expose the tube of the pipe section.

An apparatus made in accordance with the invention can cope with special pipe sections employing access tubes and yet the length and weight of the apparatus need not be increased to any significant extent. The receptacle of the apparatus may have a rear wall in the form of a bulkhead with an opening forming the sealed opening in combination with the plate component and/or the hollow unit. The portions defining the sealed opening preferably have resilient seals or packings which engage on the pipe section in question. To enhance the sealing and prevent the ingress of water to the receptacle a device may be used to force the plate and/or the unit downwardly against the pipe section in question. The plate component which may engage on a pipe section over a small upper part of its circumference can be removed from the receptacle or pivoted or slidably displaced to an inoperative position when the unit is to be used. Similarly the unit can be removed or merely displaced to an inoperative non-obstruction position when it is not in use, i.e., when normal pipe sections are installed. Since the plate and the unit only engage on a portion of the pipe section sufficient to negotiate the peripheral zone of the special pipe section having the access tube these components can be relatively small and light in weight and will not adversely affect the control of the displacement of the receptacle. Quick-release connectors of any known suitable type can be used to connect the plate and the unit to the receptacle and preferably the plate is connectible to the interior of the bulkhead and the unit is connectible to the exterior of the bulkhead.

For cleaning purposes it may be desirable to provide a closable opening in the wall of the hollow unit.

To actually excavate the trench the apparatus may employ a drive shield composed of cutter planks displaceably supported on a frame connected to the receptacle.

The invention also provides an apparatus for use in laying a pipe line which is composed of individual pipe sections arranged end-to-end; said apparatus comprising means for forming an open trench and for supporting the walls thereof, a displaceable receptacle disposed rearwardly of the trench-forming means for receiving individual pipe sections, a multi-part sealed opening providing a passage for the pipe section from the interior to the exterior of the receptacle as the latter is displaced to follow up the advance of the trench, a movable component defining part of the sealed opening and a hollow unit usable when a pipe section having an access tube projecting from its periphery is introduced into the receptacle, said hollow unit being also capable of defining a complementary part of the sealed opening to that defined by the component and serving to extend the interior of the receptacle when the component is moved to permit the passage of the access tube of the pipe section.

The invention may be understood more readily, and various other features of the invention may become more apparent from consideration of the following description.

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
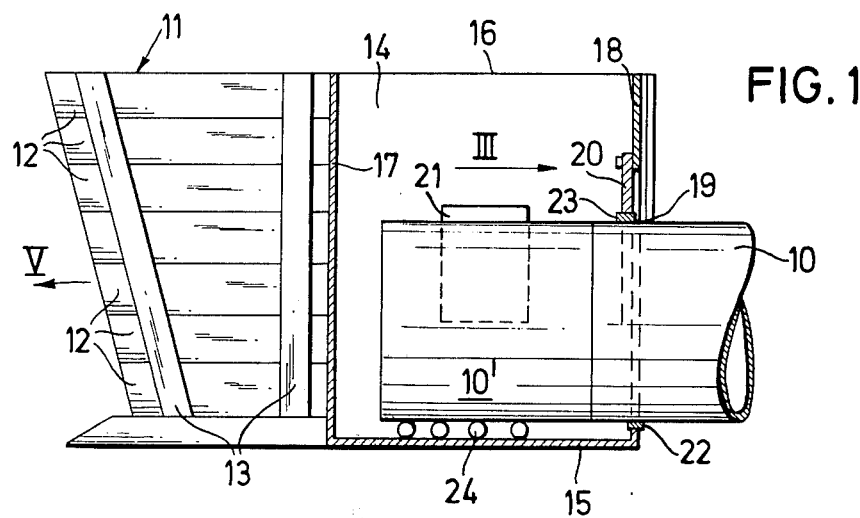
FIG. 1 is a schematic longitudinal sectional side view of apparatus made in accordance with the invention.

In general, a composite pipe line for water mains, sewerage, or other purposes is composed of individual pipe sections or elements 10 arranged end-to-end and installed with the aid of the apparatus depicted in the drawings. The individual pipe sections 10, which can be pre-fabricated from concrete, are laid in an open trench. The sections 10 can be provided with location means, such as the stepped tongue and groove connections on facing ends (not shown) to locate each section 10 against the previously installed section 10. To provide access to the pipe line certain sections 10 are preformed to include a generally upstanding access shaft or tube denoted 21 in the accompanying drawings. As the pipe line advances the installed sections 10 are covered by soil or a similar filling to reconstitute the ground surface so that the pipe sections 10 are buried beneath the ground surface; conveniently, this in-filling material can be the material removed during advancement of the trench. This means that only a sufficient length of open trench for working need be provided. To excavate the trench in advance of the actual pipe laying the apparatus uses a driving shield which defines the shape of the trench and also serves to support the side walls of the trench. In known manner, this shield is composed of a plurality of parallel elongate members or cutter planks generally arranged about the axis of the trench. Referring now to FIGS. 1 to 4, the shield is denoted 11 and the individual cutter planks are denoted 12. In known manner, the forward ends of the planks 12 have cutting edges and are urged forward individually or in groups in the direction of arrow V of FIG. 1 to penetrate a working end face of the trench. Each plank 12 is supported for displacement in its longitudinal direction and to forcibly shift the planks 12 there are provided double-acting hydraulic rams. The planks 12 are supported by and guided on a frame 13. The shifting rams are each articulated via a linkage or bracket, for example, to a respective associated plank 12 or group of planks 12 on the one hand and to the frame 13 on the other hand. It is possible to provide a ram for each plank 12 or alternatively each ram, or some of the rams may each serve to displace a group of several planks 12. In this latter case some appropriate connecting means can be provided to connect the planks 12 of the group together.

During the excavating operation, a single plank 12 or a group of planks 12 is advanced to penetrate the working end face of the trench by supplying pressure fluid to the ram associated therewith so that the latter extends. The other rams are preferably blocked in known manner so that the remainder of the planks 12 remain stationary. The planks 12 which are stationary are in firm frictional contact with the trench walls and thus serve to anchor the frame 13. The frame 13 and these stationary planks 12 thereby effectively act as an abutment for the ram which is operated. This procedure would be repeated for the other planks 12 and when all the rams have been extended they can all be operated simultaneously in a reverse sense to retract and draw up the frame 13 ready for the next operative cycle. During this latter phase when the frame 13 is drawn up, all the planks 12 collectively act as an effective abutment for the rams. The debris material excavated by the penetration of the planks 12 into the working face can be lifted or removed by any suitable appliance located above the trench or in the shield 1 and this material can then be conveniently used as the infilling material.

Rearwardly of the planks 12 and of the frame 13 relative to the working face of the trench there is provided a water-tight receptacle 14 which serves to facilitate the installation of the pipe sections 10. This receptacle 14 takes the form of a prefabricated, open-topped, box-like steel structure with a floor, side walls and end walls. The receptacle 14 rests on the floor of the trench and the individual pipe sections 10 can be introduced through the upper open zone 16 of the receptacle for connection to the endmost section 10 of the pipe-line. The receptacle 14 has an end wall 17 facing the shield 11 and connected to the frame 13 thereof. The wall 17 is preferably connected to the frame 13 with the aid of connection means providing at least a measure of articulation between the frame 13 and the receptacle 14 while resisting tensile forces. This will then ensure that when the frame 13 is moved in the direction of advancement (arrow V of FIG. 1) the receptacle 14 will be caused to follow up. The articulation enables deviations from a rectilinear path to be accommodated and where curves are to be negotiated it is desirable to make the length of the receptacle 14 as short as possible. It is also preferable to make the connection means readily detachable so that the shield 11 and the receptacle 14 can be separated if desired. The connection means can be in the form of one or more levers or rods pivotably attached to the wall 17 and to the frame 13 with detachable pivot pins engaging in brackets for example. A modified form of connection means which permits relative movement between the frame 13 and the receptacle 14 may also be adopted. In this case the aforementioned levers or rods could be replaced by one or more hydraulic piston and cylinder units, preferably double-acting.

Figure 3:
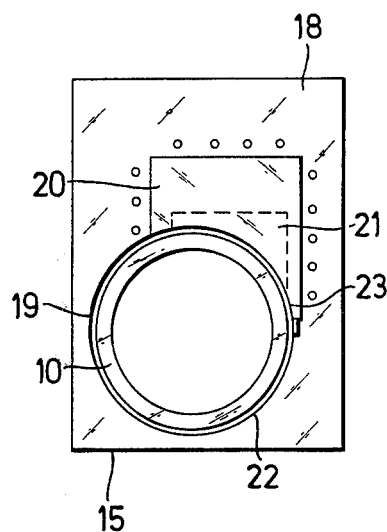
FIG. 3 is a view of part of the apparatus taken in the direction of arrow III in FIG. 1.

The other end wall of the receptacle 14 permits access to the pipe-line as will now be described. As shown in FIGS. 1 and 3, the rear end wall of the receptacle 14 remote from the shield 11 takes the form of a bulkhead 18 with an aperture 19 therein for receiving the pipe sections 10. This aperture 19 permits the pipe section 10 introduced into the receptacle 14 and connected up with the previously-installed section 10 to pass out from the receptacle 14 to extend the pipe-line as the receptacle 14 is moved up. To facilitate connection between the pipe sections 10 in the receptacle 14 and the relative movement between the pipe-line and the receptacle 14 a set of rollers 24 is provided at the floor region of the receptacle 14. The pipe section 10 introduced into the receptacle 14 via the entry zone 16 can thus be lowered onto the rollers 24 as shown and manipulated as desired. A component in the form of a plate 20 is detachably secured to the inner face of the bulkhead 18 with quick-release fastenings or connectors represented diagrammatically in FIG. 3. The plate 20 has a curvilinear lower edge with a curvature matching that of the pipe section 10. The lower edge of the plate 20 is provided with a seal or packing 23 which engages on an upper portion of the circumference of the pipe section 10 extending through the aperture 19. The aperture 19 has a part-circular portion which also matches the curvature of the pipe sections 10 and which combines with the lower edge of the plate 20 to form a continuous circular profile. The remaining portion of the aperture 19 is overlapped by the plate 20. The part-circular portion of the aperture 19 is also provided with a seal or packing 22 which engages on the major part of the exterior of the pipe section 10. The seals 22, 23 are preferably resilient and prevent water and slime from entering the receptacle 14 from the trench.

Figure 2:
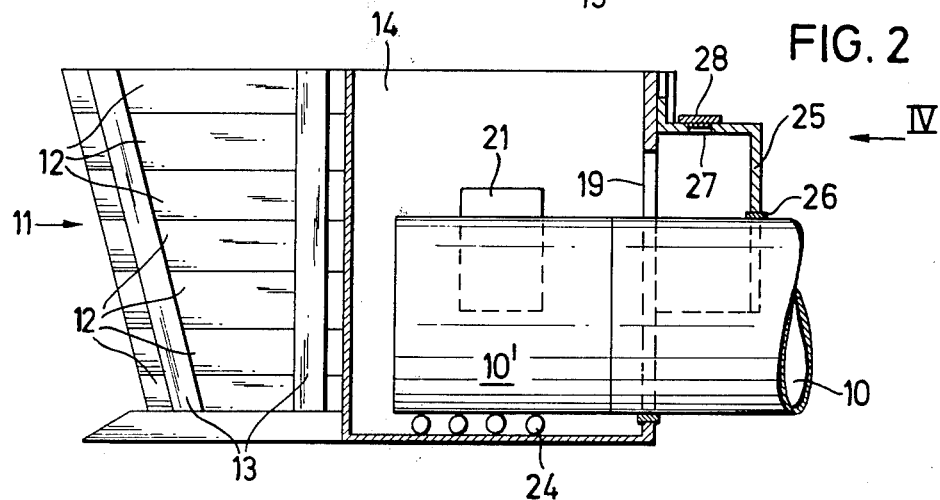
FIG. 2 is a view of the apparatus corresponding to FIG. 1 but depicting a different operating condition.
Figure 5:
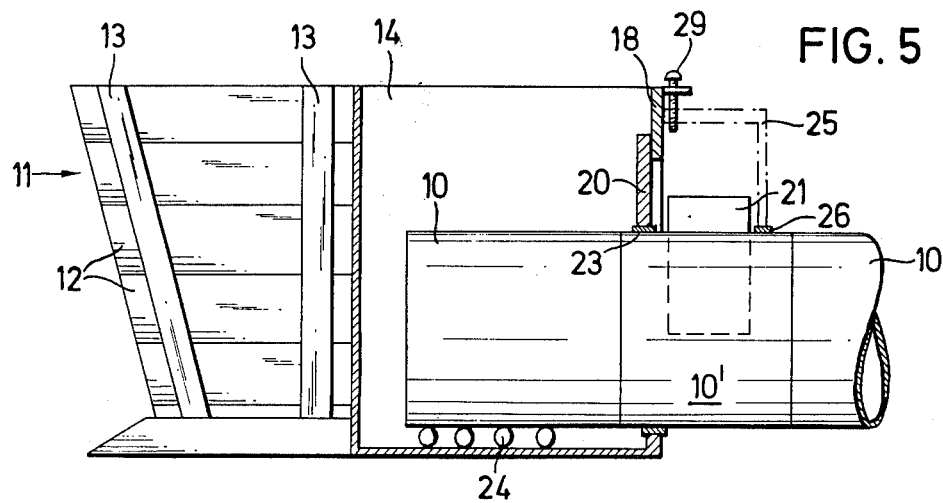
FIG. 5 is a view of the apparatus corresponding to FIG. 1 but depicting another operating condition as well as a modification thereto.
Figure 4:
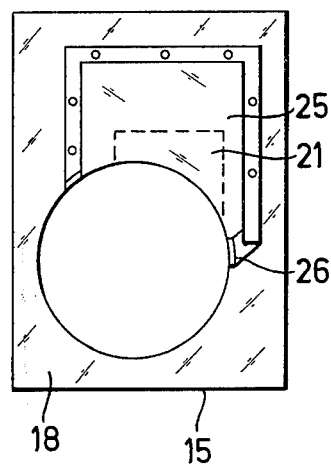
FIG. 4 is an end view of the apparatus taken in the direction of arrow IV in FIG. 2.

While the arrangement shown in FIGS. 1 and 3 will perform quite satisfactorily with normal pipe sections it is known to include in a pipe-line, special pipe sections having an access tube performed therewith. Where a special pipe section of this type is to be accommodated the apparatus can be easily converted as shown in FIGS. 2 and 4 and as will now be described. Assuming that this special pipe section 10' with its access tube or shaft 21 is lowered into the receptacle 14 then, as shown in FIG. 1, the aperture 19 must allow the passage of the tube 21 while maintaining the sealing of the interior of the receptacle 14. To permit this, a further box-like hollow unit 25 is mounted to the exterior of the bulkhead 18 as shown in FIGS. 2 and 4. The unit 25 defines a space sufficient to accommodate the tube 21 and is connected with the bulkhead 18 with the aid of quick-release fastenings or connectors conveniently of the same type used to attach the plate 20 to the bulkhead 18. Th unit 25 has a curved edge, matching that of the plate 20 and similarly a resilient seal or packing 26 on this edge engages on the exterior of the pipe section 10 previously installed. Once the unit 25 has been assembled the seals 26, 22 prevent the ingress of water to the receptacle 14 and the plate 20 can now be moved away from the pipe section 10 or removed. The apparatus is then in the condition illustrated in FIG. 2. The receptacle 14 can now be moved up with the shield 11 so that the tube 21 passes into the space enclosed by the unit 25. This position is represented in FIG. 5 where like reference numerals to FIGS. 1 and 2 are used and where the unit 25 is represented in chain-dotted lines. When this condition is reached the plate 20 can be re-connected to the bulkhead 18 as also shown in FIG. 5. The seal 23 of the plate 20 engages on the section 10' and permits the unit 25 to be removed or stowed away for subsequent re-use when desired. The next pipe section 10 is lowered into the receptacle 14 and the process can continue as before.

The quick-release connectors fixing the unit 25 or the plate 20 to the bulkhead 18 can be screwed or bolt type connectors or wedge devices but they should be water-tight to preclude any ingress of water into the receptacle 14. The unit 25 has an opening 27 therein (FIG. 2) closed with a detachable plug 28. This opening permits cleaning and the drainage of water which may accumulate in the unit 25 when the latter is being mounted to the bulkhead 18.

In a modified construction shown in FIG. 5 a screw-threaded member 29 is mounted to the bulkhead 18 and enables force to be applied to the unit 25 to clamp the latter by way of its seal 26 against the pipe section 10'. Other forms of force-applying means such as a piston and cylinder unit can be employed instead of the simple member 29. It may also be desirable to adopt a force-applying means for the plate 20 which serves to urge the seal 23 thereof against the interior of the pipe sections 10', 10.

It is also possible to have the unit 25 permanently connected to the bulkhead 18 but movable between an operative position as shown in FIG. 2 and a stowed inoperative position where it does not obstruct the relative movement between the pipe line and the apparatus. Such an arrangement can be achieved by a guideway permitting the unit 25 to slide in relation to the bulkhead 18. It is also possible to adopt a similar arrangement for the plate 20, for example by utilizing a guideway in which the plate 20 can be raised or lowered or by utilizing a pivot connection.

I claim:

1. An apparatus for use in laying a pipe line which is composed of individual pipe sections arranged end-to-end, comprising: trench forming means for forming an open trench and for supporting the walls thereof, a displaceable receptable operably coupled to the rear of the trench-forming means for receiving individual pipe sections, said receptacle having a multi-part sealed opening providing a passage for the pipe sections from the interior to the exterior of the receptacle as the receptacle is displaced to follow the advance of the trench, said sealed opening having a movable component and a hollow unit usable when a pipe section having an access tube projecting from its periphery is introduced into the receptacle, said hollow unit and said movable component defining complementary parts of the sealed opening and serving to extend the interior of the receptacle when the movable component is moved to permit the passage of the access tube of the pipe section.

2. An apparatus for use in laying a pipe line which is composed of individual pipe sections arranged end-to-end, comprising: trench means for forming an open trench and for supporting the walls thereof, a receptacle located at the rear of the trench forming means for receiving the individual pipe sections, said receptacle having a sealed opening between the interior and exterior of the receptacle thereby permitting the pipe sections to be arranged end-to-end and the receptacle moved in the direction of advancement as the pipe line is extended, a plate component and a hollow unit on said receptacle each respectively capable of defining part of the sealed opening, said hollow unit being adapted to extend the interior of the receptacle while maintaining the sealed opening, whereby the plate and the hollow unit are usable individually and successively to accommodate a pipe section provided with an access tube projecting outwardly from its exterior periphery.

3. An apparatus according to claim 2, further including quick release connectors to couple said plate component and the hollow unit to the receptacle.

4. An apparatus according to claim 2, wherein the plate component in use is connected internally of the receptacle and the unit in use is connected externally of the receptacle.

5. An apparatus according to claim 2, wherein the receptacle comprises an open-topped box-like structure a wall forming a bulkhead within said structure and provided with an opening part of which forms the sealed opening.

6. An apparatus according to claim 5, wherein the plate component, the hollow unit and said part of the opening in the bulkhead are each provided with sealing means engageable with the exterior of a pipe section extending between the interior and exterior of the receptacle.

7. An apparatus according to claim 6, and further comprising means for urging the hollow unit against the exterior of a pipe section to enhance the sealing effect.

8. A method of laying a pipe-line composed of pipe sections arranged end-to-end; said method comprising excavating an open trench, introducing a pipe section into a receptacle located in the trench, arranging the pipe section in end-to-end relationship with a pipe section previously-installed and projecting through a sealed opening into the interior of the receptacle, displacing the receptacle to follow-up the advancement of the trench and repeating said sequence and whenever the pipe section to be introduced is provided with an access tube projecting outwardly from its exterior periphery carrying out the following additional steps: utilizing a hollow unit to extend the interior of the receptacle and engage on the exterior of the previously-installed pipe section to form part of the sealed opening, removing or displacing a plate defining part of the sealed opening to permit the tube of the newly-introduced pipe section to pass into the interior of the unit as the receptacle is displaced, relocating the plate to re-establish a seal with the pipe section inwardly of the receptacle relative to its tube and removing or displacing the unit to expose the tube of the pipe section.

* * * * *